United States Patent [19]
Weyer et al.

[11] Patent Number: 5,951,829
[45] Date of Patent: *Sep. 14, 1999

[54] SEPARATION OF HETEROPOLY COMPOUNDS FROM POLYETHERS, POLYESTERS AND POLYETHER ESTERS

[75] Inventors: Hans-Jürgen Weyer, Bobenheim-Roxheim; Rolf Fischer, Heidelberg; Gerhard Jeschek, Grünstadt; Herbert Müller, Frankenthal, all of Germany

[73] Assignee: BASF Aktiengesellschaft, Ludwigshafen, Germany

[ * ] Notice: This patent is subject to a terminal disclaimer.

[21] Appl. No.: 08/809,688

[22] PCT Filed: Oct. 6, 1995

[86] PCT No.: PCT/EP95/03955

§ 371 Date: Mar. 27, 1997

§ 102(e) Date: Mar. 27, 1997

[87] PCT Pub. No.: WO96/11221

PCT Pub. Date: Apr. 18, 1996

[30] Foreign Application Priority Data

Oct. 7, 1994 [DE] Germany ............... 44 35 920

[51] Int. Cl.⁶ ............... B01D 3/34; C07C 41/34; C08G 65/10; C08G 65/20
[52] U.S. Cl. ............... 203/38; 203/41; 203/58; 203/91; 210/638; 210/664; 210/666; 210/729; 528/502; 568/617; 568/621; 568/682; 568/693
[58] Field of Search ............... 203/68, 70, 41, 203/58, 91, 38; 159/DIG. 28; 564/504, 505, 487; 528/494, 417, 502; 568/617, 679, 682, 621, 620, 693; 210/638, 664, 665, 728–729, 723, 666, 774, 500.21; 436/178; 560/79

[56] References Cited

U.S. PATENT DOCUMENTS

| | | | |
|---|---|---|---|
| 4,792,627 | 12/1988 | Aoshima et al. | 564/487 |
| 5,099,074 | 3/1992 | Mueller et al. | 568/617 |
| 5,414,143 | 5/1995 | Weyer et al. | 568/617 |
| 5,416,240 | 5/1995 | Weyer et al. | 568/617 |
| 5,741,888 | 4/1998 | Weyer et al. | 528/494 |

FOREIGN PATENT DOCUMENTS

| | | |
|---|---|---|
| 000 944 | 3/1979 | European Pat. Off. . |
| 126471 | 11/1984 | European Pat. Off. . |
| 158229 | 10/1985 | European Pat. Off. . |
| 181 621 | 5/1986 | European Pat. Off. . |
| 503 394 | 9/1992 | European Pat. Off. . |
| 8083028 | 11/1981 | Japan . |
| 61-200120 | 3/1985 | Japan . |
| 1754732 | 11/1989 | U.S.S.R. . |
| 1369304 | 10/1974 | United Kingdom . |

*Primary Examiner*—Virginia Manoharan
*Attorney, Agent, or Firm*—Keil & Weinkauf

[57] ABSTRACT

A method of separating heteropoly compounds from mixtures of polyethers, polyesters and/or polyether esters, a protic component and heteropoly compounds, wherein the protic component is removed from the mixture and subsequently separating off the heteropoly compound as a separate phase. The polymer phase which remains is preferably brought into further contact with a solid adsorbent that is capable of adsorbing heteropoly compounds.

9 Claims, No Drawings

SEPARATION OF HETEROPOLY COMPOUNDS FROM POLYETHERS, POLYESTERS AND POLYETHER ESTERS

The invention relates to a method of separating heteropoly compounds from mixtures comprising polyethers, polyesters and/or polyether esters, a protic component and heteropoly compounds, by removing the protic component from the mixture and subsequently separating off the heteropoly compound as a separate phase.

Polyethers, polyesters and polyether esters are employed widely, for example in hydraulic fluids or as a diol component in the preparation of polyurethanes. They are prepared by cationic polymerization or copolymerization of appropriate monomers, such as, for example, cyclic ethers, acetals, polyalcohols or lactones, with the aid of Brönstedt or Lewis acid catalysts. Catalysts which have proven particularly advantageous for a ring-opening polymerization are heteropoly acids and heteropoly acid salts, referred to collectively below as heteropoly compound(s) or HPA. In various processes for preparing certain novel derivatives, but also for improving the technical feasibility and product quality in the case of existing processes, polymerization is carried out in the presence of protic compounds.

EP-A 0 126 471 discloses, for example, the HPA-catalyzed polymerization of THF and the copolymerization of THF with various other cyclic ethers in the presence of water to form polyether glycols. EP-A 0 158 229 describes the preparation of polyether glycols by copolymerization of cyclic ethers with difunctional and higher polyfunctional alcohols.

According to JP-A 61-200120, lactones can be polymerized, alone or together with cyclic ethers, in the presence of hydroxyl-containing compounds and using heteropoly acids as catalysts.

In accordance with EP-A 0 503 393 and EP-A 0 503 394, polyether glycol monoethers and polyether glycol monoesters can be prepared by polymerizing cyclic ethers in the presence of monoalcohols or monocarboxylic acids and with HPA catalysts.

These polymerization processes for preparing polyethers, polyesters and polyether esters are accompanied by the formation of polymer phases which, owing to incomplete reaction, still include residues of monomer(s), of added protic compound such as water, alcohols, carboxylic acids, etc., any solvents employed, and dissolved heteropoly compound(s). The percentage amount of HPA catalyst dissolved in the polymer phase is considerable with these reactions and may be up to 1% by weight or more, based on the polymer phase. If separation is configured merely as a distillation to remove unreacted monomer, protic additive and any solvent employed from this phase, then the dissolved catalyst is not precipitated out but remains in dissolved form in the polymer. On the one hand, this must be prevented on quality grounds; on the other hand, it is desirable for reasons of cost—since heteropoly acids are very expensive—to recover the majority of the catalyst.

To solve this problem, EP-A 0 181 621 proposes the addition to the polymer phase of a hydrocarbon or halogenated hydrocarbon which does not form an azeotrope with the monomer(s) used, whereby the majority of the dissolved heteropoly compound is precipitated as a separate phase. The hydrocarbon/polymer phase is subsequently treated in a manner known per se with a solid adsorbent. To obtain the polymer, it is necessary at the end, after having separated off unreacted monomer, protic additive and any solvent added, to separate off the latterly added (possibly halogenated) hydrocarbons. A workup technique of this kind has the disadvantage that, owing to the volume of the polymer phase, which is greater as a result of the addition of the (possibly halogenated) hydrocarbon, apparatus of larger dimension is required for the distillation, and consequently the capital investment costs are higher; also, the removal of the added (possibly halogenated) hydrocarbon, whose boiling point is usually above that or those of the monomer or monomers, involves considerable additional energy costs.

In SU 1754732 A1, concentration of the polymer phase to 50–90% polymer is likewise followed by the addition of a hydrocarbon of 1–15 carbon atoms in order to precipitate the heteropoly compound. Instead of further purification by adsorption, however, a liquid organic nitrogen base is then added, which together with remaining heteropoly compound—which in this case must refer to the acid—forms an insoluble salt which precipitates and can be separated off in a conventional manner. The purity of about $50 \times 10^{-6}\%$ heteropoly compound in the polymer which can be achieved by this means is, nevertheless, inadequate for the majority of applications.

It is an object of the present invention, accordingly, to provide an effective, simpler and more cost-effective method of purifying heteropolyacid-containing polyethers, polyesters and polyether esters.

We have found that this object is achieved by a method of separating heteropoly compounds from mixtures comprising polyethers, polyesters and/or polyether esters, a protic component and heteropoly compounds, which method comprises separating the protic component from the mixture with the aid of a membrane separation technique or by distillation, if desired azeotropically together with any solvent and/or unreacted monomer present, carrying out distillation to remove unreacted monomer and any solvent present completely, and subsequently precipitating the heteropoly compound by addition of said monomer in substantially pure form.

In accordance with the novel method it is possible to purify polyethers, polyesters and/or polyether esters from heteropoly compound(s). In this context, the purification method described can be employed for any mixture comprising HPA and one or more of the abovementioned polymers. The abovementioned polymeric compounds may be composed, for example, of monomers from the group consisting of cyclic ethers, acetals, diols, higher alcohols and lactones. However, it is also possible for polymeric compounds consisting of other monomers to be freed from dissolved heteropoly compounds by the novel method. The molar mass of the polyethers, polyesters and/or polyether esters to be purified is not subject to any restriction, but is preferably below 5000.

The polyethers, polyesters and/or polyether esters comprising heteropoly compounds(s) are employed as they are or in dissolved form, for example and preferably in the solution thereof as obtained in the polymerization. In this description and the claims, the terms polymer phase and (polymer) mixture refer to a phase comprising at least one of the above polymers, while the term polymer solution refers to a phase which still, in addition, includes a low molecular mass organic component acting as solvent.

The polymerization process itself is of little importance to the novel purification of polyethers, polyesters and/or polyether esters. The polymerization can be carried out continuously or batchwise, and the polymerization system may, for example, comprise one or two phases or be heterogeneous.

In general, the polymer solution which is formed in the polymerization still includes a considerable proportion of monomer(s), a large amount of the initially added protic compound(s), and dissolved heteropoly compound(s). For the purposes of this invention the term protic compound refers to a compound which has OH groups and a $pK_a \leq 20$; examples are $H_2O$, carboxylic acids and alcohols. Since it may be advantageous to carry out the polymerization in the presence of a solvent, the polymerization system may also include one.

In a preferred polymerization process with HPA catalysis, operation is such as to give a polymerization mixture having two liquid phases: a catalyst phase and a monomer/polymer phase. A typical monomer/polymer phase, as obtained, for example, in the ring-opening polymerization of THF to polytetrahydrofuran (polyTHF) in the presence of water using $H_3PW_{12}O_{40}$ as catalyst in a two-phase polymerization system, has the following composition (amounts in % by weight): 77.3% THF, 21.2% polyTHF, 1.2% $H_3PW_{12}O_{40}$, 0.3% water.

The composition of the polymer phase which is used for the novel process therefore depends on the nature of the catalyst, of the monomer or monomers, of the protic additive, and on the content of any solvent used, and is not critical for the method.

The novel removal of protic compounds from the polymerization solutions can be accomplished by a wide variety of methods. For example, it may be favorable to employ membrane separation techniques. Protic compounds furthermore, can be separated off by adsorption, for example with the aid of molecular sieves, or by absorption, for example by removal with the assistance of a chemical reaction. A technique highly simple in terms of apparatus is the distillative separation of the protic compound, possibly as an azeotrope with monomer. It is also possible to remove all low-boiling components together from the polymer solution and then to add again an appropriate amount of pure monomer which is substantially free from protic compounds. In the case of distillative separation, it is particularly preferred to operate within a pressure range which makes possible a boiling temperature of 50–70° C.

In the case of removal of the protic compound or, if all low-boiling components are removed together, in the case of renewed addition of pure monomer, the majority of the HPA dissolved in the polymer solution is precipitated in solid form. In this case it may be advantageous to mix the solution thoroughly in a suitable manner, for example by conventional stirring. For the removal of HPA, temperatures are chosen at which the method is simple to carry out, normally from 0 to 60° C.; above this point, the solubility of the HPA in the polymer phase may be too great. To complete the precipitation, the mixture can be left standing for from 0.1 to 100 hours. Usually a maximum of 0.5 hour is sufficient.

In the case of distillative removal of the protic compound, the amount of the monomer distilled off and/or of the monomer added is optimized appropriately for each individual case. In general, it is advantageous—in terms of precipitating the heteropoly compound after the protic compound has been separated off—to establish a monomer/polymer mass ratio of from 0.1:1 to 10:1.

The separated azeotrope of monomer and protic compound, or else the mixture of all separated highly volatile compounds, can normally be recycled to the polymerization stage directly, without further work up.

The novel method can be carried out continuously or batchwise, but preferably continuously, and advantageously working under an inert-gas atmosphere. Customary reactors or reactor configurations which are suitable for continuous methods, for example tube reactors or cascades of stirred vessels, can be used for this purpose.

The novel process makes it possible to separate the majority of the HPA dissolved in the polyether, polyester and/or polyether ester solutions in a form, likewise, which can be recycled directly to the polymerization stage. For example, by distilling off unreacted THF and water from the abovementioned monomer/polymer phase obtained in the course of an $H_3PW_{12}O_{40}$-catalyzed THF polymerization in the presence of water, and then replacing the THF that has been distilled off by pure, dry THF, about 90% of the $H_3PW_{12}O_{40}$ originally dissolved in the THF/polyTHF phase is separated off in solid form.

The individual processes which take place in the course of HPA precipitation by removal of protic compounds are still not clear. A possible basis might be that the removal of the protic components reduces the solubility of the heteropoly compounds—as a result of the disappearance of hydrogen bonds—to such a level that they precipitate from the polymer solution.

The term heteropoly acids refers, for the purposes of the present invention, to inorganic polyacids having at least two different central atoms, which form from weak, polybasic oxyacids of a metal, preferably from those of chromium, molybdenum, vanadium and tungsten, and/or from the corresponding oxides in these metals, for example $CrO_3$, $MoO_3$, $V_2O_5$ or $WO_3$, and from those of a different metal or nonmetal, for example arsenic, boron, iodine, phosphorus, selenium, silicon, germanium or tellurium, as mixed, partial anhydrides. In general the atomic ratio of the former elements to the latter elements in these heteropoly acids is from 2.5 to 12, preferably 9 or 12.

Examples of heteropoly acids as can be removed in the novel method are:

dodecamolybdatophosphoric acid ($H_3PMo_{12}O_{49} \times nH_2O$),
dodecamolybdatosilicic acid ($H_4SiMo_{12}O_{40} \times nH_2O$),
dodecamolybdatocerium(IV) acid ($H_8CeMo_{12}O_{40} \times nH_2O$),
dodecamolybdatoarsenic(V) acid ($H_3AsMo_{12}O_{40} \times nH_2O$),
hexamolybdatochromium(III) acid ($H_3CrMo_6O_{24}H_6 \times nH_2O$),
hexamolybdatonickel(II) acid ($H_4NiMo_6O_{24}H_6 \times 5H_2O$),
hexamolybdatoiodine acid ($H_5IMo_6O_{24} \times nH_2O$),
octadecamolybdatodiphosphoric acid ($H_6P_2Mo_{18}O_{62} \times 11H_2O$),
octadecamolybdatodiarsenic(V) acid ($H_6As_2Mo_{18}O_{62} \times 25H_2O$),
nonamolybdatomanganese(IV) acid ($H_6MnMo_9O_{32} \times nH_2O$),
undecamolybdatovanadatophosphoric acid ($H_4PMo_{11}VO_{40} \times nH_2O$),
decamolybdatodivanadatophosphoric acid ($H_5PMo_{10}V_2O_{40} \times nH_2O$),
dodecavanadatophosphoric acid ($H_7PV_{12}O_{36} \times nH_2O$),
dodecatungstosilicic acid ($H_4SiW_{12}O_{40} \times 7H_2O$),
dodecatungstophosphoric acid ($H_3PW_{12}O_{40} \times nH_2O$),
dodecatungstoboric acid ($H_5BW_{12}O_{40} \times nH_2O$),
octadecatungstodiphosphoric acid ($H_6P_2W_{18}O_{62} \times 14H_2O$),
octadecatungstodiarsenic(V) acid ($H_6As_2W_{18}O_{62} \times 14H_2O$),
hexamolybdatohexatungstophosphoric acid ($H_3PMo_6W_6O_{40} \times nH_2O$).

It is of course also possible to remove mixtures of heteropoly acids. The novel method is often used to remove dodecatungstophosphoric acid, dodecatungstosilicic acid and/or dodecamolybdatosilicic acid, since these are employed with preference as catalysts owing to their ready availability.

The novel method is used with particular preference for the purification of polymers in whose preparation processes the free heteropoly acids have been employed as catalysts.

However, the separation of alkali metal and/or alkaline earth metal salts of heteropoly acids is also possible.

Polyethers, polyesters and polyether esters with an HPA content reduced as described above can be purified further by bringing them into contact with a solid adsorbent. In this case these polymers can be treated directly or in solution with the solid adsorbent. Preference is given to the use of monomer/polymer mixtures which still, if appropriate, contain solvent. These mixtures can be employed just as obtained from the HPA precipitation stage or else in more concentrated or dilute form. The amount of monomer advantageously present in the polymer phase should be at least 10% by weight, preferably 50% by weight or more.

There is no restriction on the nature of the solid adsorbent, provided it is able to adsorb heteropoly compounds. Activated carbons, aluminas, oxides, hydroxides and carbonates of alkaline earth metals and rare earth metals, and also basic ion exchangers, are preferred. The amount of adsorbent used depends on the HPA content and can be from 2 to 5000 times, preferably from 10 to 1000 times, the amount of dissolved HPA. In general, the use of relatively large amounts of solid adsorbent leads to a lower residual content of HPA following the treatment.

The temperature during this purification stage is subject to no particular restriction and should be chosen such that the solution to be treated has an appropriate viscosity. Where a polyether with a mean molar mass of 1000 is employed in pure form, the appropriate temperature is normally from 20 to 150° C., preferably from 30 to 100° C.

If, after treatment with a solid adsorbent, the purified polymer still contains monomer or solvent, these can be removed, for example, by distillation under atmospheric pressure or reduced pressure, making it possible to obtain a polymer with a very low HPA content of possibly less than 1 ppm, based on pure polyether, polyester and/or polyether ester. Accordingly, it is possible by the novel method to obtain polyethers, polyesters and/or polyether esters in high purity in an economic fashion.

All concentration data in the illustrative Examples below are in % by weight. The experiments were all carried out under nitrogen. Quantitive analysis of the heteropoly acids was by means of X-ray fluorescence and atomic absorption.

EXAMPLE 1

A polymer phase obtained as per EP 126 471 in the polymerization of tetrahydrofuran (THF) to polytetrahydrofuran (polyTHF) in the presence of water using $H_3PW_{12}O_{40}$ as catalyst was employed, which had the following composition: THF (77.3%), polyTHF (21.2%), $H_3PW_{12}O_{40}$ (1.2%), water (0.3%).

200 g of this mixture were freed, at 60° C. and 20 mbar, from a total of 151 g of water and THF to leave a homogeneous residue with a clear, viscous consistency. To this residue were added 150 g of anhydrous THF, and the majority of the previously dissolved $H_3PW_{12}O_{40}$ precipitated out. After separation of 2.2 g of $H_3PW_{12}O_{40}$ by filtration, 20 g of activated charcoal (Merck) were added to the polymer phase, and the mixture was shaken at room temperature for 4 hours. The $H_3PW_{12}O_{40}$ content of the polyTHF obtained after separating off the activated charcoal and concentrating the remaining mixture under reduced pressure was less than 1 ppm.

EXAMPLE 2

A polymer phase obtained as per EP 503 393 in the polymerization of THF to polytetrahydrofuran monomethyl ether (polyTHF monomethyl ether) in the presence of methanol using $H_4SiW_{12}O_{40}$ as catalyst was employed, which had the following composition: THF (84.4%), polyTHF monomethyl ether (11.6%), $H_4SiW_{12}O_{40}$ (2.2%), methanol (1.8%).

200 g of this mixture were freed, at 60° C. and 20 mbar, from a total of 170 g of methanol and THF to leave a homogeneous residue with a clear, viscous consistency. To this residue were added 150 g of anhydrous THF, and the majority of the previously dissolved $H_4SiW_{12O40}$ precipitated out. After separation of 3.8 g of $H_4SiW_{12}O_{40}$ by filtration, 20 g of activated charcoal (Merck) were added to the polymer phase, and the mixture was shaken at room temperature for 4 hours. The $H_4SiW_{12}O_{40}$ content of the polyTHF monomethyl ether obtained after separating off the activated charcoal and concentrating the remaining mixture under reduced pressure was less than 1 ppm.

EXAMPLE 3

A polymer phase obtained as per EP 503 394 in the polymerization of THF to polytetrahydrofuran monoformate (polyTHF monoformate) in the presence of formic acid using $H_3PW_{12}O_{40}$ as catalyst was employed, which had the following composition: THF (71.1%), polyTHF monoformate (17.6%), $H_3PW_{12}O_{40}$ (2.4%), formic acid (2.9%).

200 g of this mixture were freed, at 60° C. and 20 mbar, from a total of 155 g of formic acid and THF to leave a homogeneous residue with a clear, viscous consistency. To this residue were added 100 g of anhydrous THF, and the majority of the dissolved $H_3PW_{12}O_{40}$ precipitated out. After separation of 4.2 g of $H_3PW_{12}O_{40}$ by filtration, 20 g of activated charcoal (Merck) were added to the polymer phase, and the mixture was shaken at room temperature for 4 hours. The $H_3PW_{12}O_{40}$ content of the polyTHF monoformate obtained after separating off the activated charcoal and concentrating the remaining mixture under reduced pressure was less than 1 ppm.

EXAMPLE 4

A polymer phase obtained as per EP 158 229 in the copolymerization of THF and ethylene glycol using $H_3PMo_{12}O_{40}$ as catalyst was employed, which had the following composition: THF (82.1%), copolymer (15.8%), $H_3PMo_{12}O_{40}$ (1.6%), ethylene glycol (0.5%).

200 g of this mixture were freed, at 60° C. and 20 mbar, from a total of 162 g of ethylene glycol and THF to leave a homogeneous residue with a clear, viscous consistency. To this residue were added 150 g of anhydrous THF, and the majority of the dissolved $H_3PMo_{12}O_{40}$ precipitated out. After separation of 2.5 g of $H_3PMo_{12}O_{40}$ by filtration, 20 g of activated charcoal (Merck) were added to the polymer phase, and the mixture was shaken at room temperature for 4 hours. The $H_3PMo_{12}O_{40}$ content of the copolymer of THF and ethylene glycol obtained after separating off the activated charcoal and concentrating the remaining mixture under reduced pressure was less than 1 ppm.

EXAMPLE 5

A polymer phase obtained as per JP 61/200120 in the copolymerization of THF and caprolactone in the presence of water using $H_3PW_{12}O_{40}$ as catalyst was employed, which had the following composition: caprolactone (54.3%), polyether ester (41.2%), $H_3PW_{12}O_{40}$ (4.2%), $H_2O$ (0.3%).

200 g of this mixture were freed, at 60° C. and 20 mbar, from a total of 104 g of water, THF and caprolactone to leave a homogeneous residue with a clear, viscous consistency. To this residue were added 100 g of anhydrous THF, and the majority of the dissolved $H_3PW_{12}O_{40}$ precipitated out. After separation of 6.8 g of $H_3PW_{12}O_{40}$ by filtration, 20 g of activated charcoal (Merck) were added to the polymer phase, and the mixture was shaken at room temperature for 4 hours. The $H_3PW_{12}O_{40}$ content of the copolymer of THF and caprolactone obtained after separating off the activated charcoal and concentrating the remaining mixture under reduced pressure was less than 1 ppm.

We claim:

1. A method of separating heteropoly compounds from a mixture comprising polyether, polyesters and/or polyether esters, a protic component and heteropoly compounds formed by the cationic polymerization or copolymerization of monomers forming said polyethers and/or polyether esters, which method comprises separating the protic component from the mixture with the aid of a membrane separation technique or by distillation, optionally azeotropically together with any solvent and/or unreacted monomer present in the mixture, carrying out distillation to remove unreacted monomer and any solvent present, and subsequently separating the heteropoly compound as a separate phase by addition of a monomer substantially free from said protic component to precipitate said heteropoly compound.

2. The method of claim 1, wherein a polyether is employed which includes polyoxytetramethylene groups.

3. The method of claim 1, wherein the added monomer is tetrahydrofuran.

4. The method of claim 1, wherein the pressure during distillation is chosen so as to give a distillation temperature of 50–70° C.

5. The method of claim 1, wherein a monomer and polymer weight ratio, after the protic component has been separated off and, said monomer has been added, is from 0.1:1 to 10:1.

6. The method of claim 1, wherein after the protic component has been separated and the heteropoly compound has been separated off the mixture is brought into contact with a solid adsorbent capable of adsorbing heteropoly compounds.

7. The method of claim 1, wherein a solid adsorbent or a mixture of two or more solid adsorbents from the group consisting of activated carbons, aluminas, alkaline earth metal and rare earth metal oxides, hydroxides and carbonates, and basic ion exchangers is employed.

8. The method of claim 1, wherein the protic component separated off is reused in the polymerization together with solvent and/or monomer likewise separated off.

9. The method of claim 1, wherein the heteropoly compound separated after removal of the protic component is reused as polymerization catalyst.

* * * * *

UNITED STATES PATENT AND TRADEMARK OFFICE
CERTIFICATE OF CORRECTION

PATENT NO.: 5,951,829

DATED: September 14, 1999

INVENTOR(S): WEYER et al.

It is certified that error appears in the above-identified patent and that said Letters Patent is hereby corrected as shown below:

Col. 7, claim 1, line 13, "polyether" should be --polyethers--.

Col. 7, claim 1, line 16, after "polyethers" insert --, polyesters--.

Signed and Sealed this

Sixth Day of June, 2000

*Attest:*

Q. TODD DICKINSON

*Attesting Officer*      *Director of Patents and Trademarks*